United States Patent
Cron et al.

(10) Patent No.: US 11,571,925 B2
(45) Date of Patent: *Feb. 7, 2023

(54) RESILIENT COMPOSITE STRUCTURAL SUPPORT

(71) Applicant: Compagnie Generale des Etablissements Michelin, Clermont-Ferrand (FR)

(72) Inventors: Steven M Cron, Simpsonville, SC (US); Ryan Michael Gaylo, Simpsonville, SC (US); Timothy Brett Rhyne, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 306 days.

This patent is subject to a terminal disclaimer.

(21) Appl. No.: 16/475,314

(22) PCT Filed: Dec. 29, 2017

(86) PCT No.: PCT/US2017/068990
§ 371 (c)(1),
(2) Date: Jul. 1, 2019

(87) PCT Pub. No.: WO2018/126157
PCT Pub. Date: Jul. 5, 2018

(65) Prior Publication Data
US 2019/0337329 A1    Nov. 7, 2019

Related U.S. Application Data

(63) Continuation of application No. PCT/US2016/069440, filed on Dec. 30, 2016.

(51) Int. Cl.
*B60B 9/26* (2006.01)
*B60C 7/14* (2006.01)

(52) U.S. Cl.
CPC ............... *B60B 9/26* (2013.01); *B60C 7/146* (2021.08); *B60B 2360/341* (2013.01);
(Continued)

(58) Field of Classification Search
CPC ............... B60B 9/26; B60B 2360/341; B60B 2360/3418; B60B 2360/50; B60C 7/14;
(Continued)

(56) References Cited

U.S. PATENT DOCUMENTS

| 711,081 A | 1/1902 | Stevens |
| 1,095,600 A * | 5/1914 | Sackett ..................... B60B 9/26 |
| | | 152/80 |

(Continued)

FOREIGN PATENT DOCUMENTS

| CN | 203157578 U1 | 8/2013 |
| DE | 29608495 U1 | 8/1996 |

(Continued)

OTHER PUBLICATIONS

European Patent Office; International Search Report and Written Opinion for patent application PCT/US2016/069440; dated Oct. 19, 2017; Publisher: European Patent Office, Rijswijk, Netherlands, pp. 1-10, attached.

(Continued)

*Primary Examiner* — Kip T Kotter
(74) *Attorney, Agent, or Firm* — John Steckler Schwab (57) ABSTRACT

A spoke for a wheel attaching an outer tread to a hub, the spoke having a first and second spoke elements joined by a joint body comprised of an elastomer connecting the first spoke element to a second spoke element.

16 Claims, 11 Drawing Sheets

(52) U.S. Cl.
CPC .............. *B60B 2360/3412* (2013.01); *B60B 2360/3418* (2013.01); *B60B 2360/50* (2013.01); *B60C 7/14* (2013.01)

(58) Field of Classification Search
CPC ........ B60C 2007/146; B60C 2007/107; B60C 7/146; B60C 7/107
See application file for complete search history.

(56) References Cited

U.S. PATENT DOCUMENTS

| | | | | |
|---|---|---|---|---|
| 1,349,019 | A | * | 8/1920 | Timberlake ............. B60B 9/26 152/80 |
| 1,665,558 | A | | 4/1928 | Montgomery |
| 2,742,941 | A | * | 4/1956 | Johnson .................. B60C 7/12 152/326 |
| 3,730,244 | A | | 5/1973 | Grace |
| 3,973,613 | A | | 8/1976 | Marzocchi |
| 4,553,577 | A | | 11/1985 | Gregg |
| 4,715,419 | A | | 12/1987 | Kawasaki |
| 5,042,544 | A | | 8/1991 | Dehasse |
| 5,358,210 | A | * | 10/1994 | Simon ...................... F16F 1/40 244/173.2 |
| 5,565,257 | A | | 10/1996 | Tingley |
| 6,321,808 | B1 | | 11/2001 | Spragg |
| 6,422,279 | B1 | | 7/2002 | Williams |
| 7,013,939 | B2 | * | 3/2006 | Rhyne ................. B60B 1/0223 152/246 |
| 7,363,805 | B2 | | 4/2008 | Jayakumar |
| 7,418,988 | B2 | | 9/2008 | Cron |
| 10,654,318 | B2 | * | 5/2020 | Kim ....................... B60C 7/143 |
| 2007/0267116 | A1 | | 11/2007 | Rhyne |
| 2008/0250843 | A1 | | 10/2008 | Albohr |
| 2008/0265659 | A1 | | 10/2008 | Heyse |
| 2010/0193097 | A1 | | 5/2010 | Mcnier |
| 2014/0083581 | A1 | | 3/2014 | Schaedler et al. |

FOREIGN PATENT DOCUMENTS

| | | | | |
|---|---|---|---|---|
| DE | 19538082 | A1 | | 4/1997 |
| FR | 331354 | A | | 12/1903 |
| FR | 334354 | A | * | 12/1903 ............. B60B 9/26 |
| FR | 348847 | A | | 4/1905 |
| FR | 1164324 | A | | 10/1958 |
| FR | 1604616 | A | | 1/1972 |
| FR | 2519910 | A1 | * | 7/1983 ............. B60B 9/26 |
| FR | 2566335 | A1 | | 6/1985 |
| GB | 165662 | A | | 6/1920 |
| JP | 2006117130 | A | | 10/2004 |
| JP | 2011183894 | A | | 9/2010 |
| JP | 2015151009 | A | | 8/2015 |
| WO | 2009005946 | A1 | | 8/2009 |
| WO | 2010007636 | A1 | | 1/2010 |
| WO | WO-2010012091 | A1 | * | 2/2010 ............. B60B 9/04 |
| WO | 2011046553 | A1 | | 4/2011 |
| WO | 2013095499 | A1 | | 6/2013 |

OTHER PUBLICATIONS

European Patent Office; International Search Report and Written Opinion for patent application PCT/US2017/068990; dated May 7, 2018; Publisher: European Patent Office, Rijswijk, Netherlands, pp. 1-11, attached.

* cited by examiner

RESILIENT COMPOSITE STRUCTURAL SUPPORT

FIELD OF THE INVENTION

The subject matter of the present invention relates to a support structure for a tire.

SUMMARY OF THE INVENTION

Aspects and advantages of the invention will be set forth in part in the following description, or may be obvious from the description, or may be learned through practice of the invention.

At least one embodiment discloses a composite spring comprised of an elastomer and a second material having a relatively higher bending stiffness than the elastomer, the composite spring having a first hinge side and a second hinge side comprised of the second material, and a joint body comprised of the elastomer, wherein the second material comprising the first hinge side and second hinge side are discontinuous or otherwise separated from one another by the joint body connecting the first hinge side and the second hinge side.

At least one embodiment according to the preceding paragraph wherein the elastomer is an elastomeric rubber.

At least one embodiment according to any of the two preceding paragraphs wherein the second material is a stiff composite such as a glass fiber reinforced resin.

At least one embodiment according to any of the three preceding paragraphs wherein the composite spring forms a support element for a tire.

At least one embodiment according to the preceding paragraph wherein the support structure is a spoke in a non-pneumatic tire.

At least one embodiment discloses a spoke for a tire, the tire being attached to a hub including an outer tread band, a first spoke element, a second spoke element and a joint body connecting said first spoke element and said second spoke element, wherein the joint body comprises an elastic material arranged such that the first spoke element and the second spoke element is deflectable in at least a first plane of bending, where in the first spoke element and second spoke element are disposed between the hub and the outer tread band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides a mechanical structure for resiliently supporting a load. For purposes of describing the invention, reference now will be made in detail to embodiments and/or methods of the invention, one or more examples of which are illustrated in or with the drawings.

Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the outer tread band and/or wheel structure.

"Circumferential direction" or the letter "C" in the figures refers to a direction is orthogonal to the axial direction and orthogonal to a radial direction.

"Forward direction of travel" or the letter "F" in the figures refers to the direction the tire was designed to predominantly travel in for aesthetics and or performance reasons. Travel in a direction different than the forward direction of travel is possible and anticipated.

"Direction of rotation" or the letter "D" in the figures refers to the direction the tire was designed to predominantly rotate in for aesthetics and/or performance reasons. Rotation in a direction opposite than the direction of rotation is possible and anticipated.

"Radial plane" means a plane that passes perpendicular to the equatorial plane and through the axis of rotation of the wheel.

"Lateral direction" or the letter "L" means a direction that is orthogonal to an equatorial plane.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Interior angle" or "Internal angle" as used herein means an angle formed between two surfaces that is greater than 0 degrees but less than 180 degrees. An acute angle, a right angle and an obtuse angle would all be considered "interior angles" as the term is used herein.

"Exterior angle" or "External angle" or "Reflex angle" as used herein means an angle formed between two surfaces that is greater than 180 degrees but less than 360 degrees.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance A loading condition of less than nominal load, but more than an unloaded state, may be considered a nominal load, though deflections will likely be less than deflections at nominal load.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Figure 1:
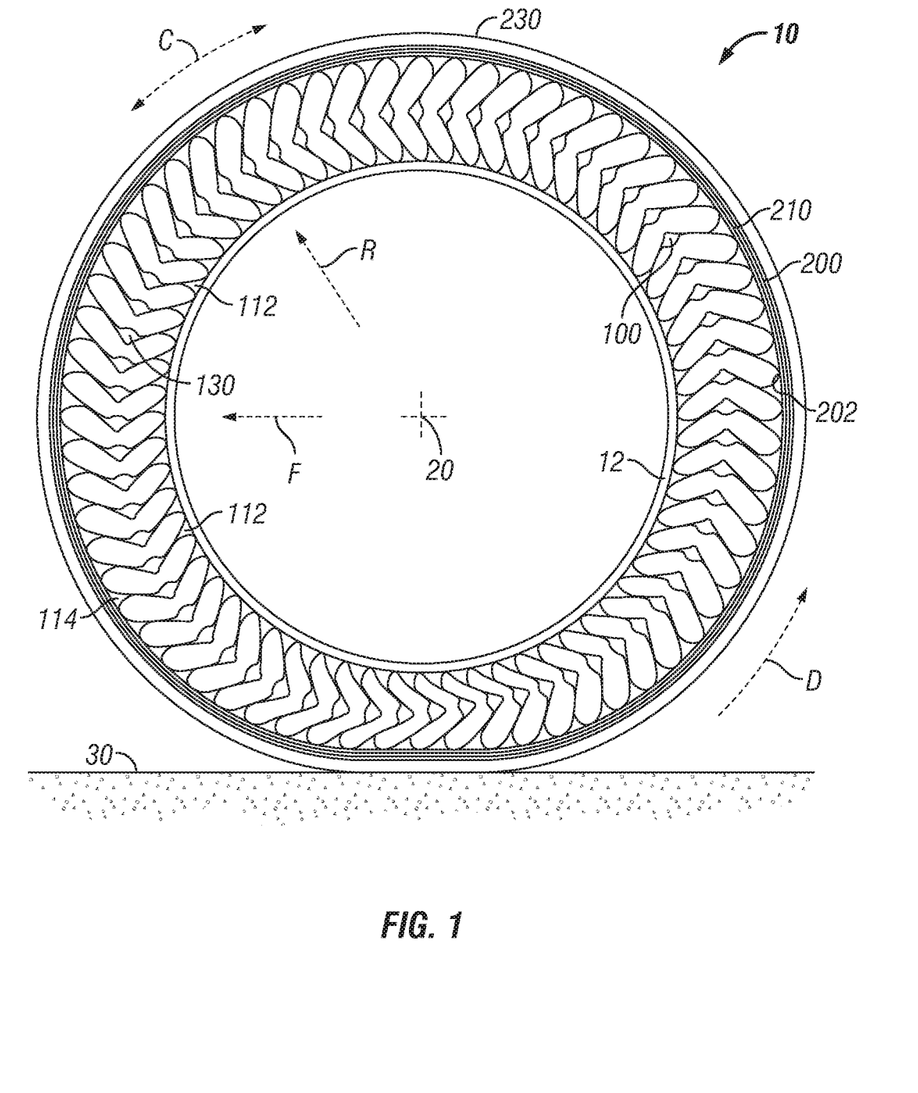
FIG. 1 provides a lateral side view of an exemplary embodiment of the present invention wherein a plurality of resilient composite structures are configured as spokes forming a part of a tire under nominal loading conditions.

FIG. 1 shows a lateral side view of an exemplary embodiment of the present invention wherein a plurality of resilient composite structures are configured as spokes 100 and are attached to an outer tread band 200 forming a part of a tire 10. The tire 10 may be incorporated into a wheel. For example the tire 10 may be part of non-pneumatic wheel having a hub 12 which is attached to a passenger vehicle allowing the vehicle to roll across a ground surface. Other objects and vehicles may incorporate the invention, including but not limited to: heavy duty truck, trailer, light truck, off-road, ATV, bus, aircraft, agricultural, mining, bicycle, motorcycle and passenger vehicle tires. Such a non-pneumatic wheel would possess a hub 12 that would have a radially outer surface having an axis of revolution about a central axis 20. The tire 10 may be attached to the hub 12 by any of a number of methods, for example, by mechanical fasteners such as bolts, screws, clamps or slots, and/or by adhesives such as cyanoacrylates, polyurethane adhesives, and/or by other bonding materials or a combination thereof.

The tire 10 shown here possesses an axis of rotation 20 about which the tire 10 rotates. In this exemplary embodiment, the radially outer surface 230 of the outer tread band 200 interfaces with a ground surface 30 over which the tire rolls. Under a nominal load, the spokes 100 of the tire flex as the tire enter and exit the contact patch. Smaller deflections occur in the spokes 100 as the spoke rotates about the axis 20 outside the contact patch, but most of the deflection occurs while the spoke 100 enters, exits and travels through the contact patch.

Each spoke 100 possesses a "nose" portion 130 which acts as a resilient hinge. The "nose" portion 130 is an elastomeric joint body connecting a support element forming the radially inner portion of the spoke and a support element forming the radially outer portion of the spoke. The support elements of the spoke 100 are initially positioned at an angle relative to each other. The angle between the spoke support elements measuring less than 180 degrees is the interior angle and the angle between the spoke support elements measuring greater than 180 degrees is the exterior angle. The elastomeric joint is comprised of an elastomer attached to each spoke support element and is positioned on the side of the spoke elements on the interior angle side.

The radially inner portion of the spoke possesses a radially inner foot 112 which connects to another surface, which is the radially outer surface of the hub 12 in the present embodiment. In the present embodiment, the radially inner foot 112 is comprised of an elastomeric joint body that connects the radially outer support to the hub 12. The radially outer portion of the spoke 100 possesses a radially outer foot 114 which is comprised of another elastomeric body which connects the outer support element to yet another surface which is in the present embodiment the radially inner surface of the outer tread band 200.

In the exemplary embodiment shown, the tread band 200 comprises an elastomeric material and allows deformation to form a planar footprint in the contact patch. In the exemplary embodiment shown, the radially outer foot 114 of the spoke 100 is attached to the radially inner surface 202 of the tread band 200 and to the opposite side of the support element from the nose portion 130. In the exemplary embodiment shown, the spoke is adhered in place by a cyanoacrylate adhesive. In other embodiments, the spoke may be attached by other methods, including by adhering the elastomeric material together, for instance by using green rubber and curing the rubber components together, or using a strip of green rubber between cured or partially cured rubber components. In some embodiments, the outer tread band 200 may also possess a reinforcement to help carry the load circumferentially around the tire.

For this particular embodiment, the size of the tire 100 is 205/55R16 with the lateral width of the tread being about 165 mm.

Figure 2:
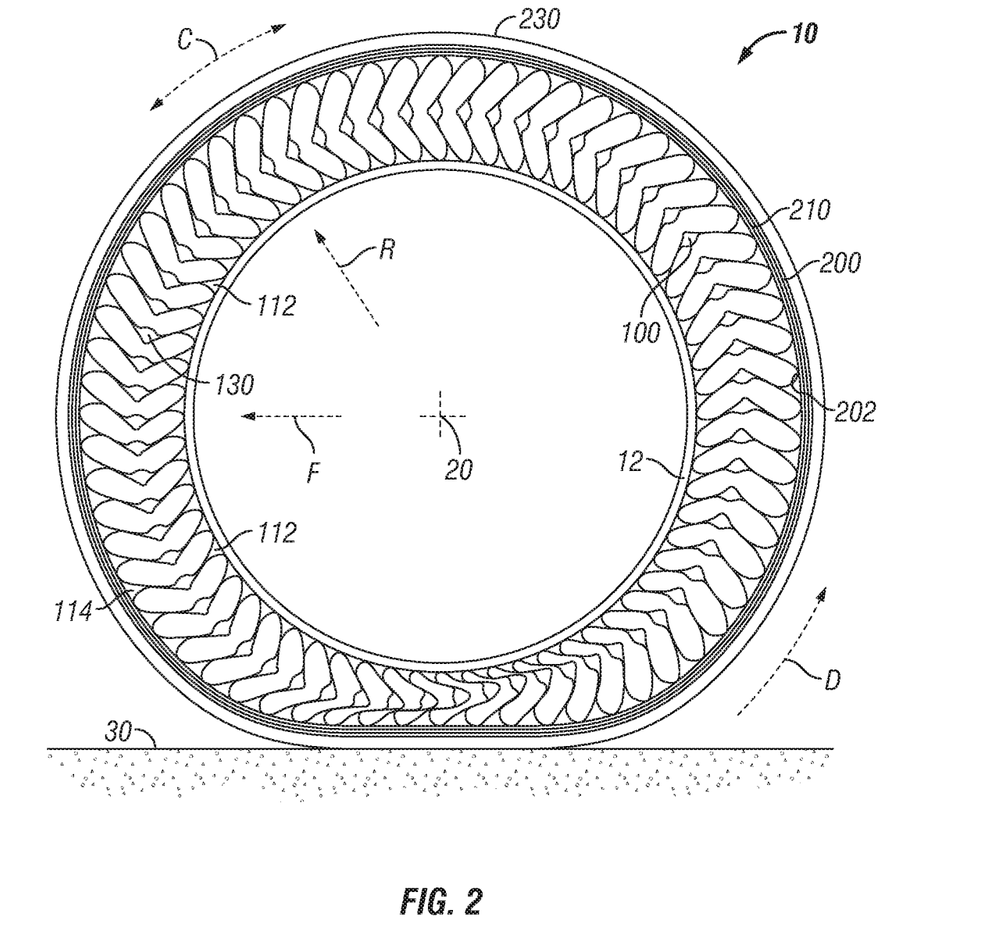
FIG. 2 provides a lateral side view of an exemplary embodiment of the present invention wherein a plurality of resilient composite structures are configured as spokes forming a part of a tire under greater than nominal loading conditions.

FIG. 2 shows the exemplary embodiment of the invention, configured as a spoke in a wheel 10, where the embodiment is loaded in excess of its nominal load. In this particular instance, the tire was loaded with 1000 kg of mass load (approximately 9800 N force). In this case the deflection exceeded 20 mm and resulted in contact between the spoke nose portion 130 and spoke foot portions 110. Under such conditions, the nose and foot portions act as a "bump stop" unloading the leg portions of the spoke. The individual spokes 100 in this situation may make contact with one another as they enter, exit and or travel through the contact patch. The contact is illustrated as occurring between the nose portion 130 and the radially outer foot 114 where the spokes are entering the contact patch and contact is illustrated as occurring between the nose portion 130 and the radially inner foot portion 112 where the spokes are exiting the contact patch. While contact of an individual spoke with the spoke adjacent to it may occur, a portion of the load may be transferred in this case, through the radially inner foot 112, through the nose portion of the spoke 100, through the radially outer foot 114 and through the outer tread band 200 to the ground 30. In a sense, the shape of the spokes of the present embodiment shown may act as a "bump stop" to prevent structural damage to the support elements or legs of the spoke connecting the feet 112, 114 with the nose 130 of the spoke. Such conditions of loading in excess of the nominal load could occur with overloading the vehicle with excess mass, or could occur if the tire encounters an obstacle, such as a curb, while traveling at high speed. While this particular embodiment behaves in this particular manner, other embodiments of the invention may behave differently, and may or may not exhibit "bump stop" qualities.

In the embodiment shown, the outer band 200 possesses reinforcement 210 to strengthen the outer band. A tread 230 is provided on the radially outer surface of the outer band 200.

Figure 3:
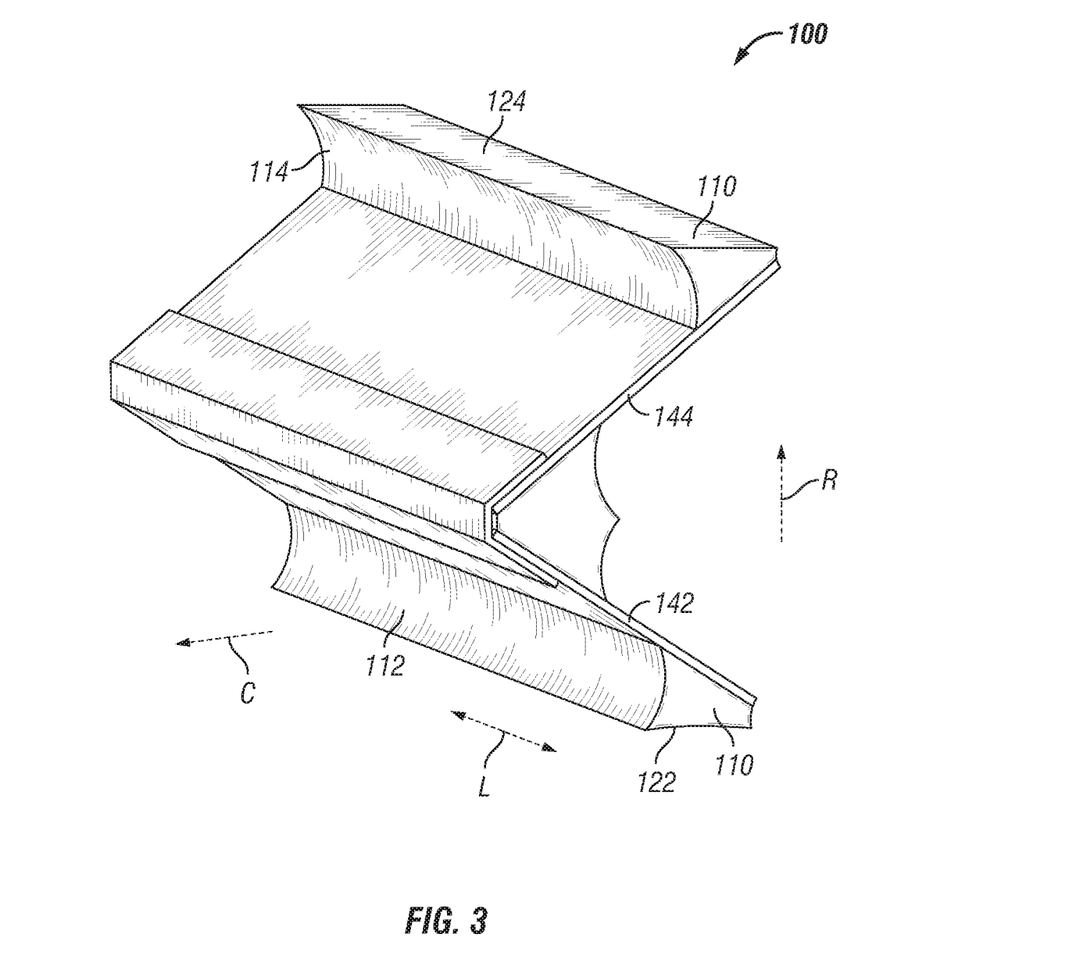
FIG. 3 provides a perspective view of an exemplary embodiment of the present invention configured as a spoke.

FIG. 3 provides a perspective view of the spoke 100 embodiment. In this particular embodiment, the spoke maintains a similar cross section profile in the lateral direction of the spoke. It can be seen that the feet 110, both the radially inner foot 112 and radially outer foot 114, each provide an attachment point to the hub 12 and outer band 200 of the wheel 10. A widening in the circumferential direction at the radially inner end of the radially inner foot 112 provides circumferentially broad surface 122 for attachment, such as adhering, bonding and/or mechanically, to the hub 12. Likewise a widening in the circumferential direction at the radially outer end of the radially outer foot 114 provides circumferentially broad surface 124 for attachment, such as adhering, bonding and/or mechanically, to the outer tread band 200. The radially inner surface 122 and radially outer surface 124 in the embodiment shown are shown to be slightly curved in the circumferential direction of the spoke to match the radius of curvature of the hub and radially inner surface 202 of the outer band 200 at the location where the spoke attaches in the respective positions. Alternatively, the surface of the radially inner surface 122 and radially outer surface 124 may also be flat in the circumferential direction of the spoke.

The nose portion, or otherwise referred to as the "joint body" 130 of the spoke 100 of the embodiment shown is comprised of an elastomeric material and acts to connect a first and second support element, here comprising a radially inner leg 142 and a radially outer leg 144 respectively. The nose portion becomes thicker in the circumferential direction between the radially inner leg 142 and radially outer leg 144. The circumferential direction of the spoke should be understood in this embodiment to be the same as the circumferential direction of the wheel 10. In reference to a single spoke as shown in this embodiment, the circumferential direction is generally orthogonal to both the radial direction and the lateral direction.

It may be observed that the radially inner leg 142 is slightly shorter than the radially outer leg 142 in the embodiment shown. This difference in length accommodates the change in radius as the spoke travels through the contact patch maximizing the space available for the adjacent spokes to "nest."

Figure 4:
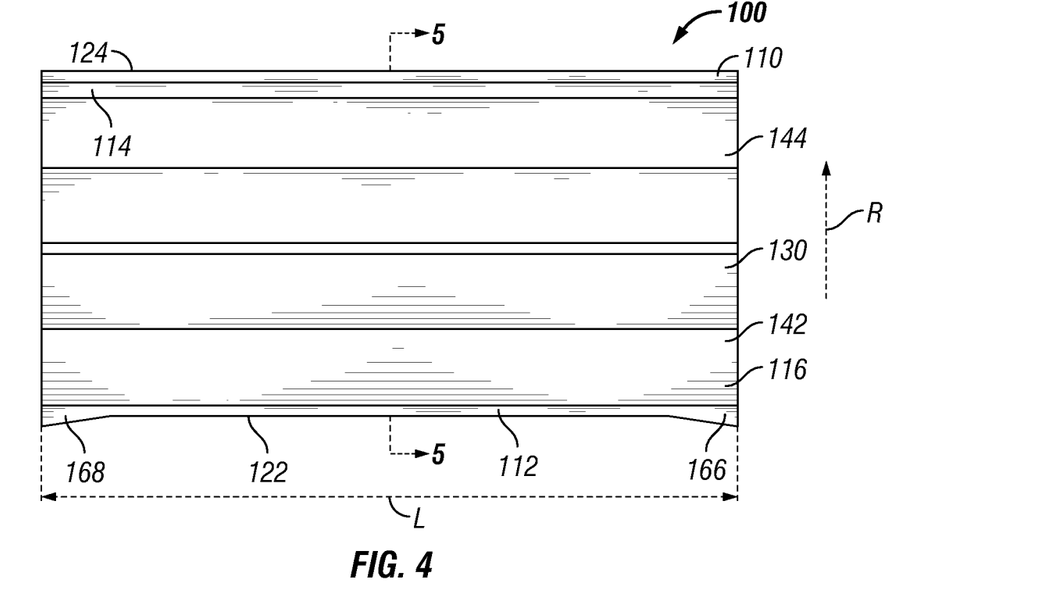
FIG. 4 provides a frontal view of the exemplary embodiment of the spoke.

FIG. 4 shows a front view of the spoke in a circumferential direction. The radially inner surface possesses a first and second protrusion 166, 168 which creates radially inner surface 122 that is curved in the lateral direction. This causes the cross section of the spoke 100 to vary slightly in the lateral direction. In alternative embodiments the spoke 100 may maintain an identical cross section in the lateral direction.

Figure 5:
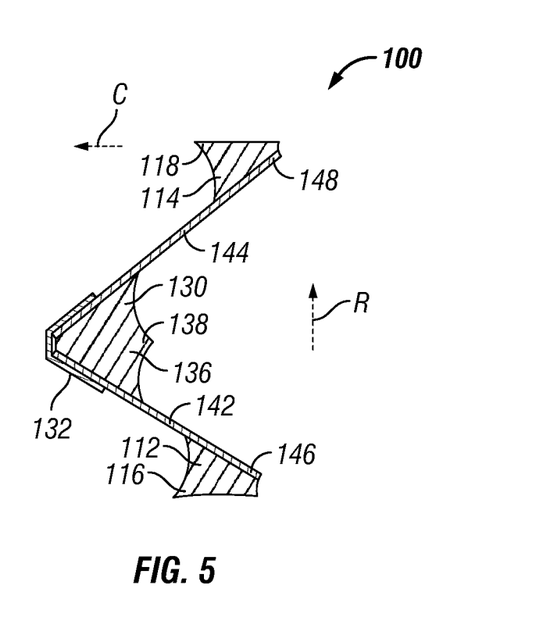
FIG. 5 provides a section view taken on line 5-5 of FIG. 4 showing an equatorial section view of the exemplary embodiment.

FIG. 5 shows a section view of the embodiment showing the main components of the spoke 100. The spoke 100 of the embodiment shown is comprised of rubber of the general type used in the construction of conventional rubber pneumatic radial tires, polyester cord material and fiberglass reinforced resin.

The rubber used in the embodiment shown comprises of a relatively soft rubber having a modulus of 4.8 MPa in the areas of the radially inner elastomeric joint body 112 and radially outer elastomeric joint body 114. Each elastomeric joint body 112, 114 is attached to the radially inner leg 142 and radially outer leg 144 respectively. The radially inner leg 142 and radially outer leg 144 are constructed to give them flexural rigidity, that is, to allow them to resiliently deform when the spoke 100 is under compression or tension. The radially outer end 148 of the radially outer leg 144 is attached to the elastomeric joint body 114, but is otherwise "free" and may move to compress or stretch the elastomeric joint body 114 when the spoke is being stretched or compressed. Likewise the radially inner end 146 of the radially inner leg 142 is attached to the elastomeric joint body 112, but is otherwise "free" and may move to compress or stretch the elastomeric joint body 112 when the spoke 100 is under compression or tension. The radially inner elastomeric joint body 112 becomes thicker in the circumferential direction nearer the hub 12 to which it is attached. In the embodiment shown, the elastomeric joint body 112 flairs outward forming a protrusion 116 nearest the hub 10. Likewise, the radially outer elastomeric joint body 114 becomes thicker in the circumferential direction nearer the outer band 200 to which it is attached. In the embodiment shown, the elastomeric joint body 114 flairs outward forming a protrusion 118 nearest the outer band 200.

In the embodiment shown, a membrane 132 is used to reinforce the nose section 130 of the spoke 100. The membrane structure 132 of the embodiment shown is comprised of polyester fibers made from an 1100 by 2 cord with a pace of approximately 1 mm and a tensile modulus of approximately 3,750 MPa. Such reinforcement fibers are similar to that commonly used in the radial cords of a pneumatic tire. The rubber surrounding the reinforcements of the membrane has a modulus of approximately 5 MPa. For the embodiment shown, this rubber is of a type used in the construction of a conventional pneumatic radial tire. Alternatively, other membrane reinforcement materials may be used, including using cords of other materials, such as aramid, cotton, nylon or rayon or combinations thereof. Alternatively, the reinforcement pace, filament count, cord count and diameter may vary. In the embodiment shown, the reinforcement membrane 132 extends approximately one-fifth of the height of the spokes, generally co-extensive with the generally triangular shaped nose elastomeric joint body 136. In the embodiment shown, the elastomeric joint body 136 thickens and flairs outward in the circumferential direction near the middle section between the radially inner and radially outer spoke legs 142, 144, forming a protrusion 138 at approximately the midpoint of the elastomeric joint body 136.

The reinforcement cords of the reinforcement membranes 132 of the exemplary embodiment are oriented generally in the radial direction along the length of the membranes.

The legs 142, 144 of the spoke 100 are comprised of fiber reinforced plastic reinforcements surrounded by a rubber to form a membrane. The leg membranes 142, 144 possess a flexural rigidity of approximately 140,000 N-mm². In this particular embodiment, the filaments have a diameter of approximately 1 mm with a pace of about 2 mm apart. The filaments of the particular embodiment shown are glass reinforced resin formed by pultrusion. The filaments of the embodiment have a modulus of approximately 10 MPa. Alternatively other reinforcements may be used, including carbon fiber such as graphite epoxy, glass epoxy or aramid reinforced resins or epoxy or combinations thereof. Unreinforced plastic reinforcements or metallic reinforcements may also be used, provided they have sufficient flexural rigidity for the nominal loads intended to be supported. Alternatively other pacing and other diameters diameter of the membranes and reinforcements may be used. The legs 142, 144 of the spoke 100 have a relatively large stiffness compared to the other components comprising the spoke 100. The legs 142, 144 resist act resiliently and have a large bending stiffness allowing the nose portion 130 of the spoke to act as a joint body connecting the radially inner leg 142 with the radially outer leg 144. The feet 112, 114 act as second and third joint bodies, connecting the radially inner leg 142 to the hub and the radially outer leg 144 with the outer band 200.

Figure 6:
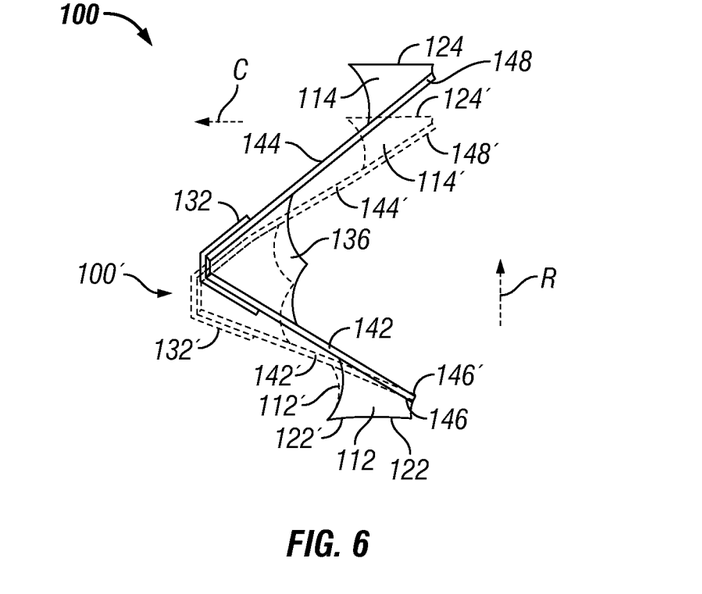
FIG. 6 provides a section view of an embodiment of the present invention forming a part of a tire, the embodiment in an unloaded state (shown in solid lines) and under nominal loading conditions in compression (shown in dashed lines).

FIG. 6 shows a partial lateral section view of the exemplary embodiment of a spoke 100 attached to an outer tread band 200 and hub 12 and forming a part of a tire 10. In the particular embodiment shown, 64 spokes are attached around the inner circumference of the outer tread band 200. Under nominal loading conditions, for the tire of the exemplary embodiment 215/45 R17 sized tire shown here, the tire deflects 20 mm from the unloaded state. In the exemplary embodiment, 500 kg of mass load (approximately 4,900 N force) was used to approximate the nominal loading condition of the tire.

When the spoke 100 is deformed radially inward, undergoing compression between the radially outer foot 114 and radially inner foot 112, the elastomeric joint body 136 of the nose 130 undergoes compression between the radially inner leg 142 and radially outer leg 144 of the spoke. The radially outer elastomeric joint body 114 of the radially outer foot 114 undergoes compression along the portion closest to the nose 130 and undergoes tension on the distal portion of the elastomeric joint body 114.

Similarly at the radially inner foot 112, when the spoke 100 is deformed radially inward, the elastomeric joint body 112 of the radially inner foot 112 undergoes compression along the portion closest to the nose 130 and undergoes tension on the distal portion of the elastomeric joint body 112.

The dashed lines in FIG. 5 show the spoke 100' undergoing compression between the radially outer foot 114' and the radially inner foot 112'. The compressed spoke 100' is shown positioned with the hub mating surface 122, 122' fixed in position while the radially outer foot 114, 114' is displaced radially inward. As such, it may be observed that the radially inner portion 146, 146' of the radially inner leg 142, 142' is displaced radially outward when the spoke is compressed such that the radially inner portion 146' of the radially inner leg 142' moves radially outward relative to the radially inner surface 122' of the radially inner foot 112'. Likewise, a similar displacement occurs at the radially outer foot 114, 114' with the radially outer portion 148, 148' of the radially outer leg 144, 144' is displaced radially inward when the spoke is compressed such that the radially outer portion 148' of the radially outer leg 144' moves radially inward relative to the radially outer surface 124' of the radially outer foot 114'. The construction of the spoke permitting displacement of the radially outer portion 148, 148' of the radially outer leg 144, 144' and radially inner portion 146, 146' of the radially inner leg 142, 142' is referred herein as having a "free" spoke end.

The nose portion 130 of the present embodiment possesses a reinforcement membrane 132 which constrains the radially inner portion of the radially outer spoke 144 and radially outer portion of the radially inner spoke 142, restraining them from displacing away from one another when the spoke is under compression. The elastomeric joint body 136 undergoes compression when the spoke 100 is compressed. It may be observed that the portion of the elastomeric joint body 136 farthest from the reinforcement membrane 132 is contracted radially as the spoke 100 is compressed. The construction of the spoke disallowing displacement of the radially inner portion of the radially outer leg 144 and radially outer portion of the radially inner leg 142 may be referred herein as being "constrained" or "not free."

Figure 7:
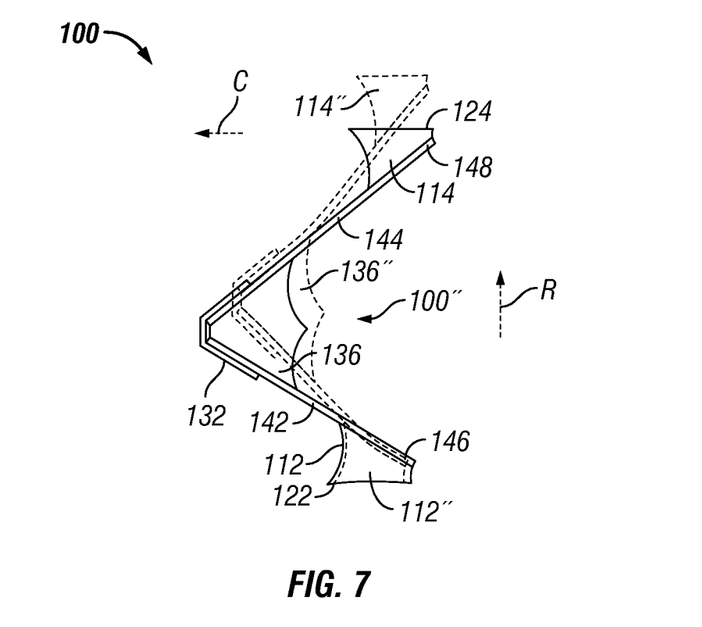
FIG. 7 provides a section view of an embodiment of the present invention forming a part of a tire, the embodiment in an unloaded state (shown in solid lines) and under nominal loading conditions in tension (shown in dashed lines).

FIG. 7 shows the same embodiment when in tension such that the radially outer foot 114, 114" is displaced away from the radially inner foot 112, 112". The spoke 100 shown generally unloaded in solid lines and also the spoke 100' is shown in tension by the dashed lines. Note how the portions of the feet 112, 112", 114, 114" which underwent compression when the spoke was in compression are undergoing tension when the spoke is undergoing tension as shown in the present figure. Likewise the portions of the elastomeric joint bodies of the feet 112, 112", 114, 114" which underwent tension when the spoke was in compression are undergoing compression when the spoke is undergoing tension as shown in the present figure. The elastomeric joint body 136, 136" of the nose portion 130, 130" undergoes tension in the portion closest to the feet 112, 112", 114, 114" of the spoke 100, 100".

Figure 8:
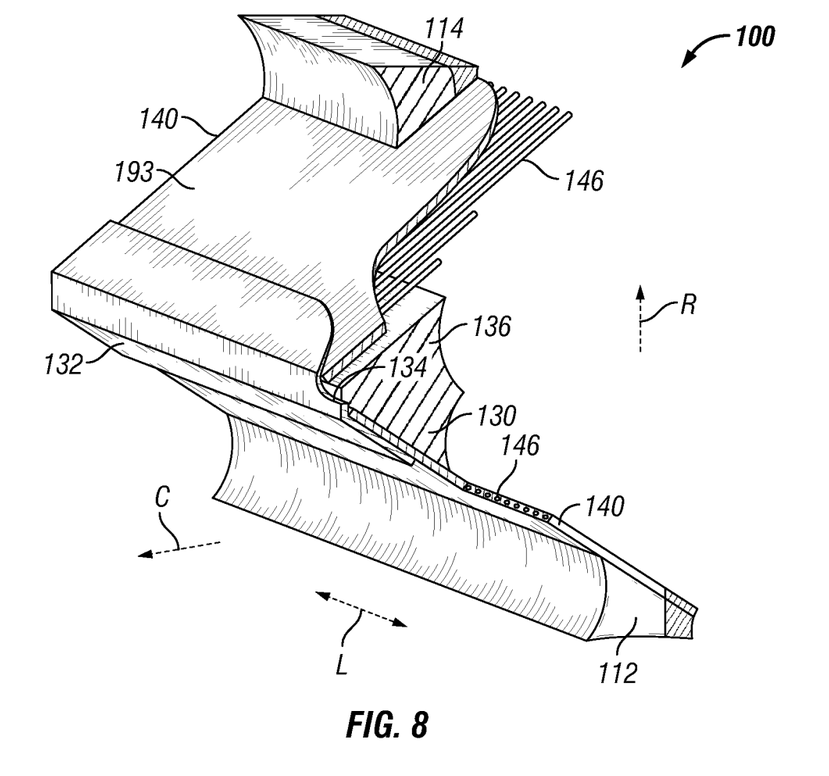
FIG. 8 provides a perspective view of an exemplary embodiment of the spoke of the present invention with portions removed to show the embodiment's components including reinforcement location and orientation.

FIG. 8 shows a perspective cutaway view of the spoke embodiment. Portions of the reinforcement 134 of the nose reinforcement membrane 132 are shown, as well as a portion of the elongated leg reinforcements 146 of the leg 140 and a part of the foot reinforcements of the foot reinforcement membrane are shown as well. The reinforcement of the nose membrane are shown oriented generally in the radial direction and wrapped around the nose 130 of the spoke 100. The support element 140 reinforcements 146 are shown as elongated reinforcements oriented generally in the radial direction along the length of the support elements 140.

Figure 9:
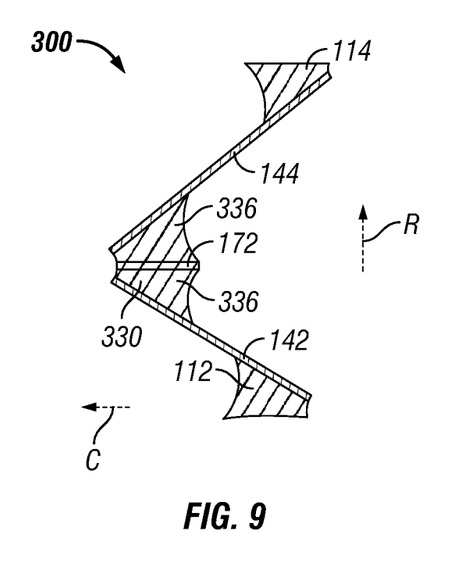
FIG. 9 provides an equatorial section view of an alternative embodiment of the invention.

Alternative embodiments of the invention are also possible and anticipated. For example, FIG. 9 shows a section view of an alternative embodiment 300 wherein the nose reinforcement membrane is not present. Instead, the portion of elastomeric joint body 336 of the nose 330 farthest from the feet 112, 114 is allowed to stretch apart in the radial direction when the spoke is under compression, much like the portion of the elastomeric joint bodies 112, 114 farthest from the nose portion 330 of the spoke 300. Thus in this embodiment, the radially inner end of the radially outer support element 144 and the radially outer end of the radially inner support element 142 are "free." In this particular embodiment, additional reinforcement 172 is placed in the elastomeric joint body 336 of the nose portion 330. This additional reinforcement inhibits movement of the elastomeric joint body in the circumferential direction that otherwise would occur due to the Poisson effect of compression and tension of the elastomeric joint body 336. In this particular embodiment, elongated reinforcements 172 are oriented in the circumferential direction generally bisecting the elastomeric joint body 336 in to two portions; a radially outer portion and a radially inner portion.

Figure 10:
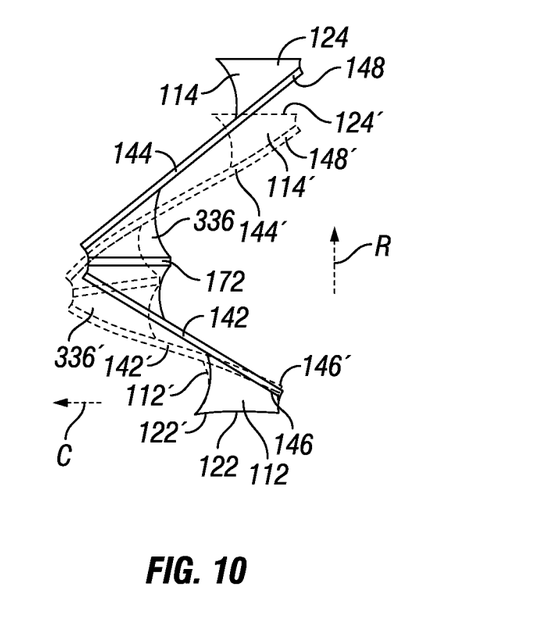
FIG. 10 provides a section view of the alternative embodiment of the present invention forming a part of a tire, the embodiment in an unloaded state (shown in solid lines) and under nominal loading conditions in compression (shown in dashed lines).

FIG. 10 shows a partial lateral section view of the alternative exemplary embodiment of a spoke 100 attached to an outer tread band 200 and hub 12 and forming a part of a tire 10 (though the outer tread band 200 and hub 10 are not illustrated here as they are in FIG. 1 and FIG. 2). In the particular embodiment shown, 64 spokes are attached around the inner circumference of the outer tread band 200. Under nominal loading conditions, for the tire of the exemplary embodiment 215/45 R17 sized tire shown here, the tire deflects 20 mm from the unloaded state. In the exemplary embodiment, 500 kg of mass load (approximately 4,900 N force) was used to approximate the nominal loading condition of the tire and nominal loading of the spoke, shown here in compression.

When the spoke 300 is deformed radially inward, undergoing compression between the radially outer foot 114 and radially inner foot 112, the elastomeric joint body 336 of the nose 330 undergoes compression in the radial direction between the radially inner leg 142 and radially outer leg 144 of the spoke along the portion closest to the feet 112, 114 of the spoke 300 and undergoes tension in the radial direction on the portion of the elastomeric joint body farthest from the feet 112, 114. The radially outer elastomeric joint body 114 of the radially outer foot 114 undergoes compression along the portion closest to the nose 330 and undergoes tension on the portion of the elastomeric joint body 114 most distal from the nose portion 330.

Similarly at the radially inner foot 112, when the spoke 100 is deformed radially inward, the elastomeric joint body 112 of the radially inner foot 112 undergoes compression along the portion closest to the nose 330 and undergoes tension on the distal portion of the elastomeric joint body 112.

The dashed lines in FIG. 10 show the spoke 100' undergoing compression between the radially outer foot 114' and the radially inner foot 112'. The compressed spoke 100' is shown positioned with the hub mating surface 122, 122' fixed in position while the radially outer foot 114, 114' is displaced radially inward. As such, it may be observed that the radially inner portion 146, 146' of the radially inner leg 142, 142' is displaced radially outward when the spoke is compressed such that the radially inner portion 146' of the radially inner leg 142' moves radially outward relative to the radially inner surface 122' of the radially inner foot 112'. Likewise, a similar displacement occurs at the radially outer foot 114, 114' with the radially outer portion 148, 148' of the radially outer leg 144, 144' is displaced radially inward when the spoke is compressed such that the radially outer portion 148' of the radially outer leg 144' moves radially inward relative to the radially outer surface 124' of the radially outer foot 114'. The construction of the spoke permitting displacement of the radially outer portion 148, 148' of the radially outer leg 144, 144' and radially inner portion 146, 146' of the radially inner leg 142, 142' is referred herein as having a "free" spoke end. As shown in this alternative embodiment, the radially inner portion of the radially outer support structure 144 and the radially outer portion of the radially inner support structure 142 may be referred herein as having "free" spoke ends.

The nose portion 330 of the present embodiment possesses a reinforcement 172 which constrains the elastomeric body 336 in the circumferential direction. The elastomeric joint body 336 undergoes compression along the portion closest to the feet 112, 114 when the spoke 300 is compressed. The Poisson effect causes bulging of the elastomeric material when it is under compression, which is restrained here by the reinforcement 172.

Figure 11:
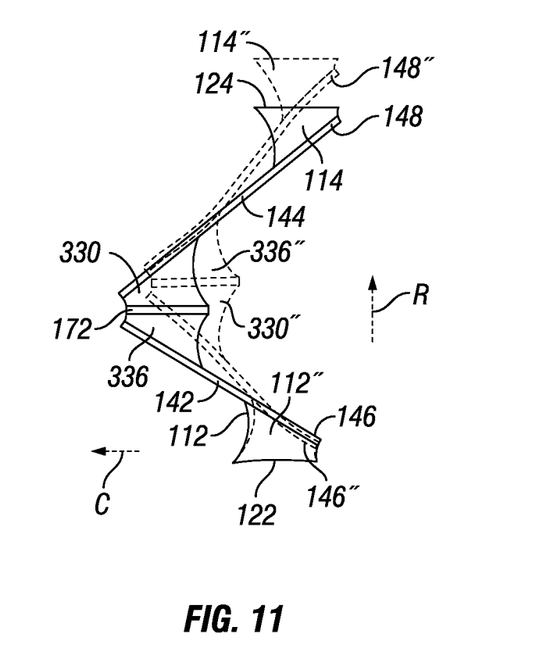
FIG. 11 shows a section view of the alternative embodiment of the present invention forming a part of a tire, the embodiment in an unloaded state (shown in solid lines) and under nominal loading conditions in tension (shown in dashed lines).

FIG. 11 shows the same embodiment when in tension such that the radially outer foot 114, 114" is displaced away from the radially inner foot 112, 112". The spoke 100 shown generally unloaded in solid lines and also the spoke 100' is shown in tension by the dashed lines. Note how the portions of the feet 112, 112", 114, 114" which underwent compression when the spoke was in compression are undergoing tension when the spoke is undergoing tension as shown in the present figure. Likewise the portions of the elastomeric joint bodies of the feet 112, 112", 114, 114" which underwent tension when the spoke was in compression are undergoing compression when the spoke is undergoing tension as shown in the present figure. The elastomeric joint body 336, 336" of the nose portion 330, 330" undergoes tension in the portion closest to the feet 112, 112", 114, 114" of the spoke and the portions of the elastomeric joint body 336, 336" of the nose portion 330, 330" undergoes compression in the portion farthest from the feet 112, 112", 114, 114" of the spoke.

Figure 12:
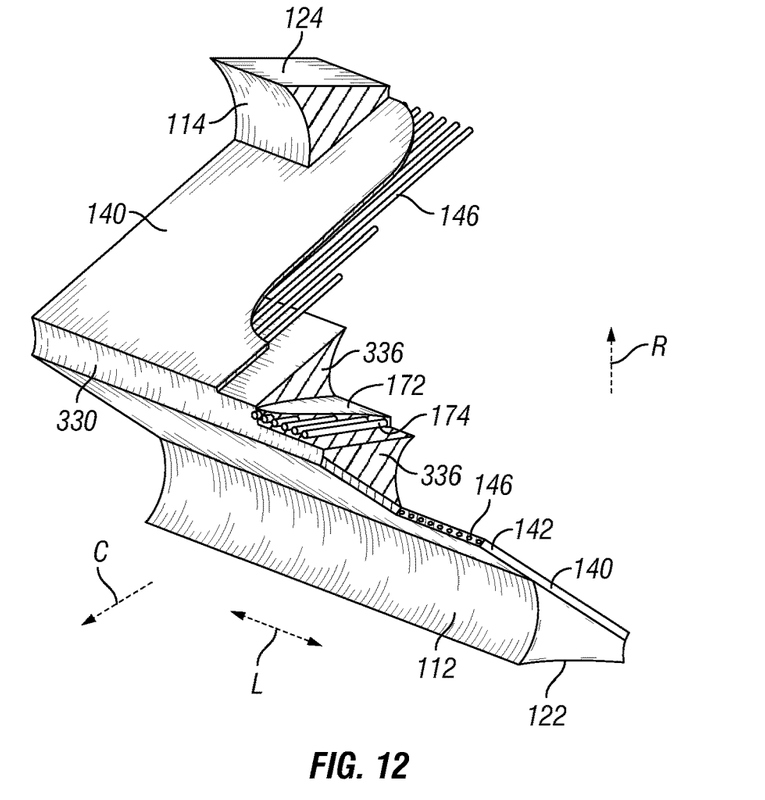
FIG. 12 shows a perspective view of the alternative exemplary embodiment of the spoke of the present invention with portions removed to show the embodiment's components including reinforcement location and orientation.

FIG. 12 shows a perspective cutaway view of the spoke embodiment. Portions of the elongated leg reinforcements 146 of the legs 140 are shown. The reinforcement 172 of the elastomeric joint body 336 is shown as a plurality of reinforcements 174 oriented in the circumferential direction. The support element 140 reinforcements 146 are shown as elongated reinforcements oriented generally in the radial direction along the length of the support elements 140. The reinforcements 146, 174 of the present embodiment are pultruded glass resin composite.

Figure 13:
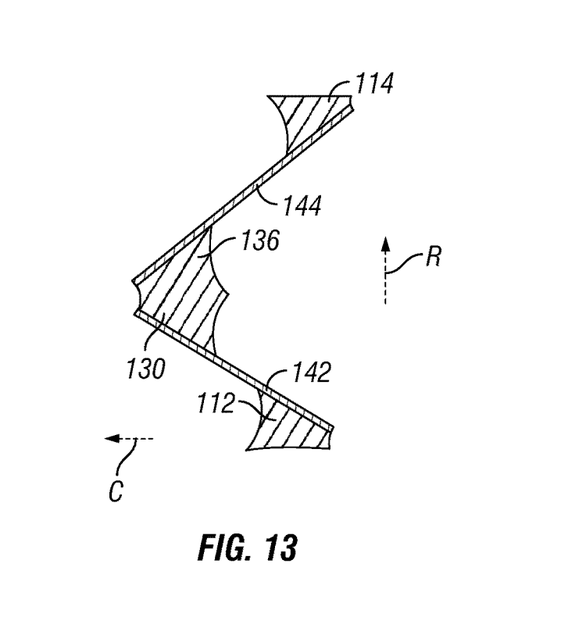
FIG. 13 shows an equatorial section view of another exemplary alternative embodiment of the invention.

FIG. 13 shows a section view of an alternative embodiment wherein neither the nose reinforcement membrane, nor the elastomeric joint body reinforcement is present. Here, like the previous embodiment, the portion of elastomeric joint body 136 of the nose 130 farthest from the feet 112, 114 is allowed to stretch apart in the radial direction when the spoke is under compression, much like the portion of the elastomeric joint bodies 112, 114 farthest from the nose portion 130 of the spoke 100. Thus in this embodiment, the radially inner end of the radially outer support element 144 and the radially outer end of the radially inner support element 142 are "free." In this particular embodiment the elastomeric joint body 136 of the nose portion 130 is free of any elongated reinforcements.

Figure 14:
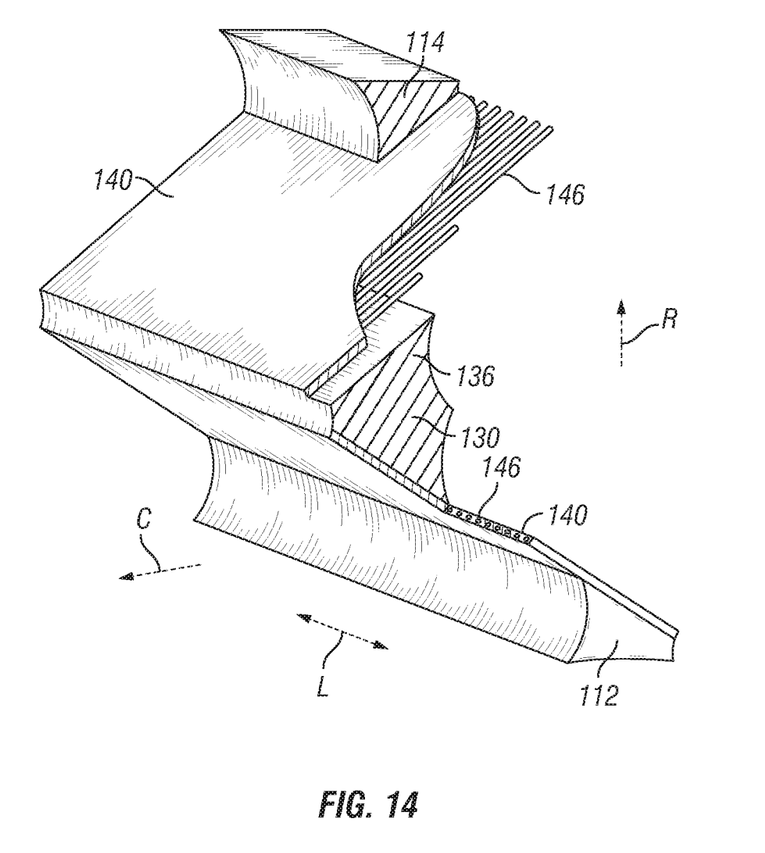
FIG. 14 shows a perspective view of the alternative exemplary embodiment of the spoke of the present invention with portions removed to show the embodiment's components including reinforcement location and orientation.

FIG. 14 shows a perspective cutaway view of the spoke embodiment. Portions of the elongated leg reinforcements 146 of the leg 140 are shown. The support element 140 reinforcements 146 are shown as elongated reinforcements oriented generally in the radial direction along the length of the support elements 140. The reinforcements 146 of the present embodiment are pultruded glass resin composite.

Figure 15:
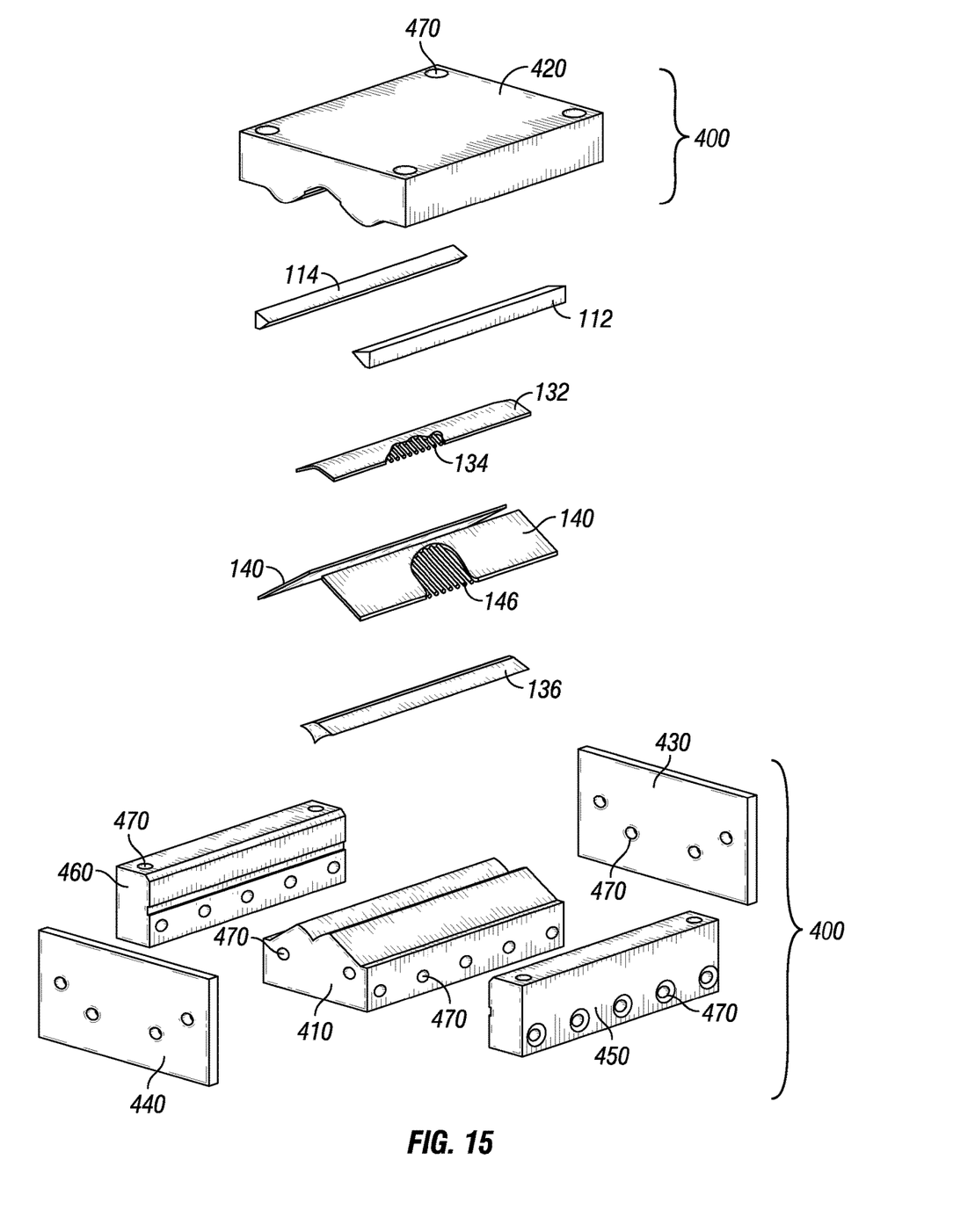
FIG. 15 provides a perspective view of an exemplary embodiment of a mold used for forming a spoke embodiment of the invention. The resilient composite structure's components are shown, with some components having a portion of the elastic material removed to show reinforcement location and orientation.

FIG. 15 shows an exploded perspective view of a mold 400, 410, 420, 430, 440, 450, 460 used to manufacture an individual spoke 100. The spoke components are shown separated as they are placed into the mold. Some of the spoke components show the orientation of the reinforcement fibers and cords. For example, the nose reinforcement membrane 132 reinforcements 134 are shown in the partial cutaway view of that component. The reinforcements are shown in this embodiment to run parallel to one another and along the width of the reinforcement membrane 132. Both of the legs 140, 142, 144 are shown and the radially inner leg 142 is shown with a partial cut-away showing the composite glass resin reinforcements 146 positioned parallel to one another and along the width of the radially inner leg 140. While the reinforcements 146 of the legs 140 are resiliently flexible, the fiber reinforcement 134 of the nose reinforcement membrane 132 are flexible enough to be permanently deformed upon molding of the surrounding rubber matrix material.

Figure 16:
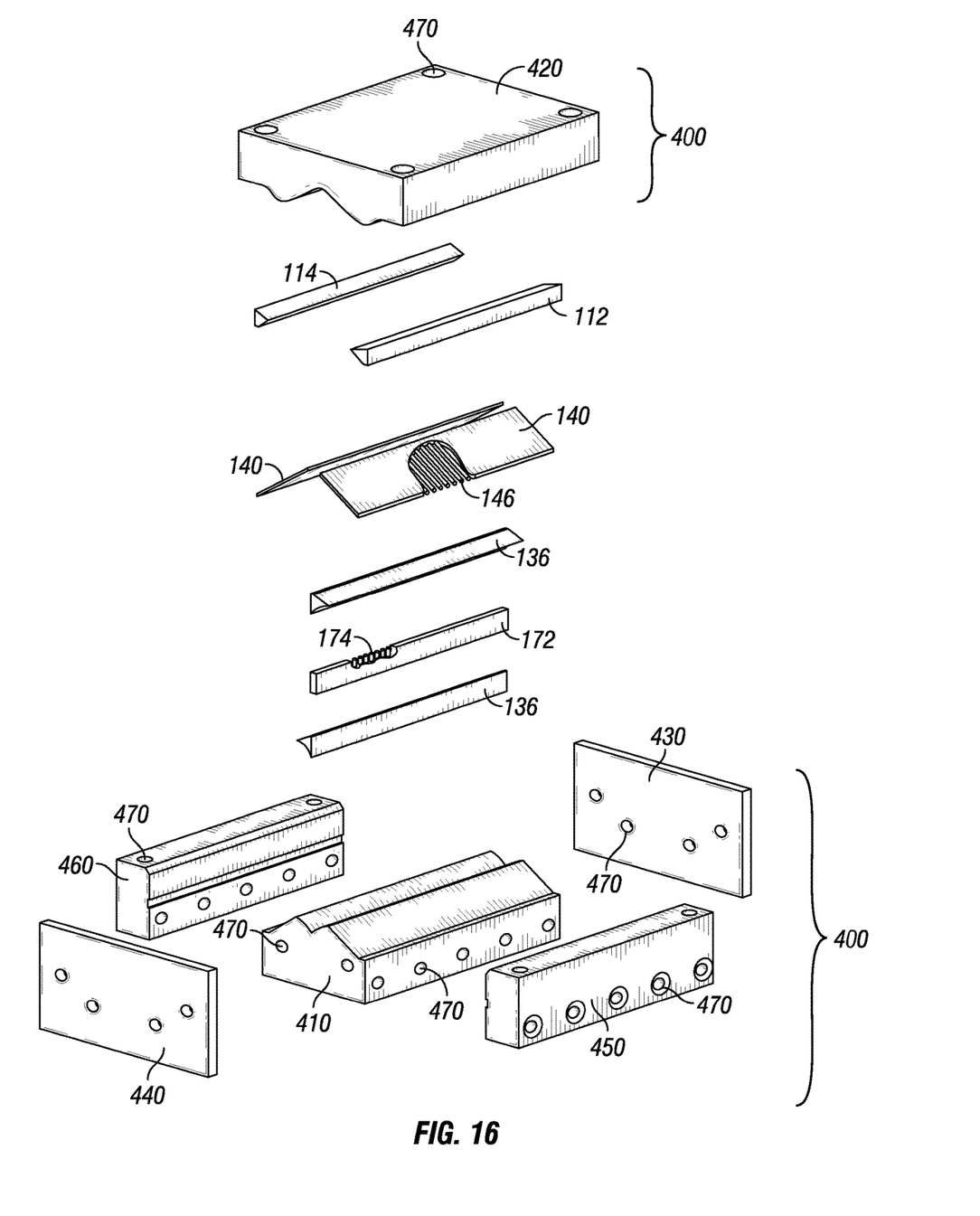
FIG. 16 provides a perspective view of an alternative exemplary embodiment of a mold used for forming an alternative spoke embodiment of the invention. The resilient composite structure's components are shown, with some components having a portion of the elastic material removed to show reinforcement location and orientation.

FIG. 16 shows an exploded perspective view of an alternative mold 400, 410, 420, 430, 440, 450, 460 used to manufacture an alternative embodiment of individual spoke 100. The spoke components are shown separated as they are placed into the mold. Some of the spoke components show the orientation of the reinforcement fibers and cords. For example, the elastomeric joint body 136 reinforcements 174 are shown in the partial cutaway view of that component. The reinforcements 174 are shown in this embodiment to run parallel to one another and along the width of the reinforcement membrane 172. Both of the legs 140, 142, 144 are shown and the radially inner leg 142 is shown with a partial cut-away showing the composite glass resin reinforcements 146 positioned parallel to one another and along the width of the radially inner leg 140. The reinforcements 146 of the legs 140 and the reinforcements 174 of the elastomeric joint body 136 are resiliently flexible. Note that in this particular embodiment, the nose membrane reinforcement 132 is omitted. Alternatively both the nose membrane reinforcement 132 may be included in combination with the elastomeric joint body reinforcement 172.

Once the various uncured components are laid in place over the mold bottom 410, the mold 400 is closed and secured. Here the mold is closed with screw fasteners through apertures 470 and secured to threaded portions of the apertures 470 of the mold components. Tightening of the fasteners exert pressure, or/and additional pressure may be applied to the mold top during curing. Heating of the mold 400 heats the rubber components within and cures the rubber, adheres the rubber components together and forms a composite spoke having excellent resilient qualities of sufficient durability for use as a structural element in an automotive non-pneumatic tire. Other uses for the resilient composite structure may include vibration isolation mounts, such as motor mounts, transmission mounts or seat mounts, or used as a resilient hinge to allow movement of one object relative to another object otherwise connected by the resilient composite structure.

The "v-shape" of the embodiments of the spoke shown and described herein allow the adjacent spokes to "nest" and give linear spring rate when deflected radially over a distance approximately equal to the tires vertical deflection. The nesting of the spokes avoid adjacent spokes from clashing under normal loading conditions.

It should be understood by a person of ordinary skill in the art that the stiffness of the spoke may be adjusted by adjusting the length of the "v" of the "v-shaped spoke", the constituent material moduli and the internal architecture of the spoke.

It should be understood that other web element configurations and geometries may be used within the scope of the invention, including web elements which are interconnected such as where they may form a honeycomb or other pattern. While when the resilient composite structure is configured as a spoke they are configured to extend in a lateral direction across the width of the tire, it should be understood that they may be configured at other angles, such as at an angle to the lateral direction of the tire. For example, the spoke may extend at a diagonal between the circumferential direction and the lateral direction of the tire.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A resilient composite structure for connecting a first surface and a second surface comprising:
   a first support element having a first end, a second end, a first side and a second side;
   a second support element having a first end, a second end, a first side and a second side, said second support element forming an interior angle with said first support element, said interior angle positioned on the first side of said first support element and the first side of said second support element;
   a first elastomeric joint body connecting said first support element first end and said second support element second end, said first elastomeric joint body positioned on the first side of said first support element and the first side of said second support element;
   a second elastomeric joint body connecting said first support element second end to said first surface and positioned on said second side of said first support element; and
   a third elastomeric joint body connecting said second support element first end to said second surface and positioned on said second side of said second support element;
   wherein said first support element second end and said second support element first end are otherwise free ends.

2. The resilient composite structure of claim 1 wherein said first surface is the outer surface of a hub and said second surface is the inner surface of an outer tread band, the hub, the resilient composite structure and the outer tread band forming a wheel.

3. The resilient composite structure of claim 2 wherein said resilient composite structure forms a spoke extending from a first lateral side of the wheel to a second lateral side of the wheel.

4. The resilient composite structure of claim 1 further comprising a reinforcement membrane connecting the first support element and second support element.

5. The resilient composite structure of claim 4 wherein the reinforcement membrane is comprised of cords.

6. The resilient composite structure of claim 4 wherein the reinforcement membrane is positioned on the second side of the first support element and the second side of the second support element.

7. The resilient composite structure of claim 4 wherein the reinforced membrane of the joint body is comprised of cords comprised of a material selected from a group consisting of polyester, rayon, aramid, nylon, and cotton.

8. The resilient composite structure of claim 1 wherein the first support element and second support element are comprised each of one or more reinforcements having a flexural rigidity greater than the elastomer comprising the first joint body.

9. The resilient composite structure of claim 8 wherein the first support element and second support element are comprised each of a plurality of elongated reinforcements.

10. The resilient composite structure of claim 8 wherein said first support element and said second support element are each comprised of a fiber reinforced plastic.

11. The resilient composite structure of claim 10 wherein the first support element and second support element are comprised of an elastomer surrounding the fiber reinforced plastic.

12. The resilient composite structure of claim 11 wherein the fiber reinforced plastic reinforcements are comprised of a plurality of fibers oriented in the direction extending from the first end to the second end of each of the support elements.

13. The resilient composite structure of claim 1 wherein the joint bodies are comprised of a rubber elastomer.

14. The resilient composite structure of claim 1 further comprising a membrane bisecting said first joint body and positioned between said first support element and said second support element.

15. The resilient composite structure of claim 14 wherein said bisecting membrane is comprised of elongated reinforcements.

16. The resilient composite structure of claim 15 wherein said elongated reinforcements of said bisecting membrane are comprised of a fiber reinforced plastic.

* * * * *